(12) United States Patent
Okahara et al.

(10) Patent No.: US 7,862,758 B2
(45) Date of Patent: Jan. 4, 2011

(54) IN-MOLD COAT-FORMING METHOD

(75) Inventors: Etsuo Okahara, Ube (JP); Toshio Arai, Ube (JP); Kazuaki Kobayashi, Yoshiki-gun (JP); Takashi Okusako, Ube (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 1630 days.

(21) Appl. No.: 10/535,423

(22) PCT Filed: Nov. 25, 2003

(86) PCT No.: PCT/JP03/15033

§ 371 (c)(1), (2), (4) Date: May 19, 2005

(87) PCT Pub. No.: WO2004/048067

PCT Pub. Date: Jun. 10, 2004

(65) Prior Publication Data

US 2006/0097425 A1    May 11, 2006

(30) Foreign Application Priority Data

Nov. 25, 2002   (JP) .............................. 2002-340369

(51) Int. Cl.
*B29C 45/16* (2006.01)
*B29C 45/04* (2006.01)
(52) U.S. Cl. .................... 264/255; 264/328.7
(58) Field of Classification Search .............. None
See application file for complete search history.

(56) References Cited

U.S. PATENT DOCUMENTS

| | | | | |
|---|---|---|---|---|
| 4,076,788 A | * | 2/1978 | Ditto | 264/255 |
| 5,071,603 A | * | 12/1991 | Kurumaji et al. | 264/40.5 |
| 5,174,933 A | * | 12/1992 | Toh et al. | 264/40.5 |
| 5,676,901 A | * | 10/1997 | Higashi et al. | 264/255 |
| 6,143,226 A | * | 11/2000 | Fujimoto et al. | 264/255 |
| 6,180,043 B1 | * | 1/2001 | Yonemochi et al. | 264/255 |
| 6,676,877 B2 | * | 1/2004 | Thompson | 264/255 |
| 6,793,861 B2 | * | 9/2004 | McBain et al. | 264/255 |

(Continued)

FOREIGN PATENT DOCUMENTS

EP    0 934 808 A2    8/1999

(Continued)

*Primary Examiner*—Edmund H. Lee
(74) *Attorney, Agent, or Firm*—Edwards Angell Palmer & Dodge LLP

(57) ABSTRACT

An in-mold coating method for molding a molded product with an excellent external appearance. A resin molded product is kept pressed against a mold cavity surface until immediately before coating. Mold-clamping force in a second step in which the shape of the resin molded product is fixed and that in a fourth step are selected so that the deformation of the mold cavity by the mold-clamping forces is substantially the same in the second and fourth steps. Even if the mold cavity deforms by the mold-clamping force in the second step, the mold cavity deforms similarly in the fourth step to provide a uniform coating thickness. Alternatively, a mold-clamping force smaller than that in the first step is selected for the second step to reduce the degree of deformation of the mold cavity and to achieve a uniform coating thickness.

10 Claims, 11 Drawing Sheets

RESIN(MOLTEN STATE)

RESIN(SEMI-SOLID STATE)

U.S. PATENT DOCUMENTS

2006/0076712 A1 * 4/2006 Yonemochi et al. ......... 264/255

FOREIGN PATENT DOCUMENTS

| | | |
|---|---|---|
| EP | 1 207 031 A1 | 5/2002 |
| JP | 11-277577 | 10/1999 |
| JP | 2000-141407 | 5/2000 |
| JP | 2000-334800 | 12/2000 |
| JP | 2001-038737 | 2/2001 |

* cited by examiner

RESIN(MOLTEN STATE)

RESIN(SEMI-SOLID STATE)

INJECTING COATING MATERIAL

COATING MATERIAL    RESIN

RESIN(MOLTEN STATE)

RESIN(SEMI-SOLID STATE)

INJECTING COATING MATERIAL

COATING MATERIAL   RESIN

RESIN(MOLTEN STATE)

RESIN(SEMI-SOLID STATE)
GAP(CORRESPONDING TO VOLUME OF THERMAL CONTRACTION)

INJECTING COATING MATERIAL
RESIN

RESIN(MOLTEN STATE)

GAP   RESIN(SEMI-SOLID STATE)

INJECTING COATING MATERIAL   GAP

IN-MOLD COAT-FORMING METHOD

TECHNICAL FIELD

The present invention relates to in-mold coating methods in which resin is molded and is coated with a coating material (which may also be referred to as paint) by injecting and curing the coating material between the resin molded product and the mold cavity surface, and also to in-mold-coated molded products formed by the methods. In particular, the present invention relates to an in-mold coating method suitable for providing a uniform coating thickness to produce a molded product with an excellent external appearance, and also to an in-mold-coated molded product formed by the in-mold coating method.

BACKGROUND ART

Conventionally, painting is often employed as a method for decorating molded products molded with thermoplastic resins.

According to a typical painting method, a molded product formed by injection molding is removed from the mold, is coated with paint by, for example, spraying or dipping, and is dried to form a hard coating covering the surface of the molded product for decoration and protection. The term "coating material" may hereinafter be used as a synonym of "paint".

In recent years, however, in-mold coating (which may be referred to as in-mold coating) has been proposed, in which resin is molded and coated in the same mold to eliminate the step of painting.

FIG. 12 shows a flow chart of an example of a known in-mold coating method. According to the in-mold coating method in FIG. 12, a thermoplastic resin, namely a base material, is molded by injection molding and is cooled to some extent. The mold is then slightly opened to form a gap between the resin molded product formed in the mold and the mold cavity. Paint is injected into the gap with a paint-injector. The mold is clamped again to uniformly spread the paint over the surface of the molded product. The spread paint is cureed to form a coating.

Because the thermoplastic resin is molded and coated in the same mold, the in-mold coating method involves fewer steps to achieve cost reduction. In addition, this method poses almost no problems such as defects caused by airborne dust adhering to a wet coating to provide high-quality products.

Studies have been made on the use of the in-mold coating method particularly for many automobile parts, such as bumpers, doors, door mirror covers, and fenders, which need high quality in external appearance.

Examples of the in-mold coating method are disclosed in, for example, Japanese Unexamined Patent Application Publication Nos. 11-277577 (Patent Document 1), 2000-141407 (Patent Document 2), 2000-334800 (Patent Document 3), and 2001-38737 (Patent Document 4).

According to the above known in-mold coating methods, however, mold-clamping force cannot be exerted on paint, namely a coating material, in reclamping if the amount of paint injected is small. Unfortunately, therefore, these methods cannot form a uniform coating on the overall coating surface of a resin molded product.

One of the causes of the nonuniform coating thickness is the decrease in the volume of the molded resin due to thermal contraction in the mold. When the thickness of the molded product decreases by thermal contraction, a gap occurs between the resin molded product and the cavity surface in the cavity. The gap is difficult to fill with paint in an amount equivalent to the desired thickness. As a result, the paint cannot be spread over the surface to be coated, and a uniform coating cannot be formed.

To solve the above problem, the amount of coating material injected may be increased to solve the problem of defective transfer of the mold surface to the coating material, though this approach poses another problem of a larger coating thickness than necessary.

Another cause of the nonuniform coating thickness is mold deformation in molding. A typical mold has high rigidity, but deforms by several to tens of micrometers when clamped with a clamping machine. Such degrees of deformation are often negligible in general resin molding. In in-mold coating, however, a resin molded product is generally coated with a coating having a thickness of about tens of micrometers. Thus the deformation of the mold cavity due to mold deformation is listed as one of the causes of a nonuniform coating thickness.

According to a known in-mold coating method, particularly, mold-clamping force after paint injecting may be changed stepwise. This method, however, results in a nonuniform coating thickness because the degree of mold deformation varies depending on the magnitude of the mold-clamping force to cause variations in the distance between the surface of a resin molded product and the mold cavity.

Referring to FIGS. 10(a) to 10(d), a gap may be formed between a resin molded product formed under general injection molding conditions and a mold cavity surface by thermal contraction of molten resin charged into the mold cavity even if the mold is not opened. Because the size of the gap varies depending on, for example, the shape of the mold cavity and the thickness of the resin molded product, a uniform gap rarely occurs over the surface to be coated. In in-mold coating, therefore, the mold must be opened to ensure a necessary coating thickness. If, however, the mold is opened, the resultant coating is undesirably extremely thick at a portion where the gap formed by thermal contraction combines with that formed by opening the mold.

If molten resin with a volume exceeding the capacity of the mold cavity is charged into the mold cavity by applying excessive charging pressure to compensate for the volume of thermal contraction of the resin, the excessive charging pressure undesirably causes, for example, variations in the thickness of a resin molded product, as shown in FIGS. 11(a) to 11(d). In an embodiment of the related art, in FIGS. 11(a) to 11(d), the excessive injection pressure causes a difference in thickness between the ends of the resin molded product and the portion around a gate part.

In addition, excessive reclamping pressure after paint injecting is undesirable because the pressure causes a phenomenon called a hump at a thick portion such as a rib and a boss. To prevent the defect, mold-clamping force after the injecting of coating material must be reduced, though a large difference between mold-clamping force in resin injection and that after the injecting of coating material undesirably results in a nonuniform coating thickness.

DISCLOSURE OF INVENTION

In light of the above problems, the present invention provides an in-mold coating method suitable for providing a uniform coating thickness to produce a molded product with an excellent external appearance, and also provides an in-mold-coated molded product formed by the in-mold coating method.

To achieve the above object, the present invention provides an in-mold coating method in which a resin molded product is molded and coated in a mold cavity formed between female and male molds. This method includes a first step of charging molten resin into the mold cavity, a second step of molding the resin molded product after the charge of the molten resin into the mold cavity by reducing the volume of the mold cavity in accordance with the thermal contraction of the molten resin to shape the molten resin, a third step of forming a gap for injecting a coating material between the resin molded product and the surface of the mold cavity by slightly opening the mold when the resin molded product solidifies to the extent to which the product can withstand the injecting pressure and flowing pressure of the coating material, and a fourth step of injecting the coating material into the gap and clamping the mold again. The mold-clamping forces in the second and fourth steps are controlled so that the deformation of the mold by clamping is substantially the same in the second and fourth steps.

This aspect is referred to as a first aspect of the present invention. In this aspect, the mold-clamping forces used in the second and fourth steps are preferably substantially the same. Substantially the same mold-clamping force means that the difference between the mold-clamping forces in terms of in-mold pressures obtained by dividing the forces by the projected area of the mold cavity is 5 MPa or less, preferably 3 MPa or less, more preferably 1 MPa or less. In addition, the pressure of the mold-clamping force in the fourth step on the coating material per unit area preferably ranges from 1 to 20 MPa, more preferably from 1 to 10 MPa. Furthermore, the mold-clamping force used in the second step is preferably smaller than that used in the first step, more preferably 10% to 50% of that used in the first step, still more preferably 10% to 25% of that used in the first step.

The present invention further provides another in-mold coating method in which a resin molded product is molded and coated in a mold cavity formed between female and male molds. This method includes a first step of charging molten resin into the mold cavity, a second step of molding the resin molded product after the charge of the molten resin into the mold cavity by reducing the volume of the mold cavity in accordance with the thermal contraction of the molten resin to shape the molten resin, a third step of forming a gap for injecting a coating material between the resin molded product and the surface of the mold cavity by slightly opening the mold when the resin molded product solidifies to the extent to which the product can withstand the injecting pressure and flowing pressure of the coating material, and a fourth step of injecting the coating material into the gap and clamping the mold again. The mold-clamping force used in the second step is smaller than that used in the first step.

This aspect is referred to as a second aspect of the present invention. In this aspect, the mold-clamping force used in the second step is preferably 10% to 50%, more preferably 10% to 25%, of that used in the first step. The mold-clamping force used in the second step preferably ranges from 2 to 15 MPa, more preferably from 4.0 to 10 MPa, in terms of in-mold pressure per unit area.

The present invention further provides another in-mold coating method in which a resin molded product is molded and coated in a mold cavity formed between female and male molds. This method includes a first step of charging molten resin into the mold cavity, a second step of molding the resin molded product after the charge of the molten resin into the mold cavity by reducing the volume of the mold cavity in accordance with the thermal contraction of the molten resin to shape the molten resin, and a third step of injecting a coating material between the resin molded product and the surface of the mold cavity when the resin molded product solidifies to the extent to which the product can withstand the injecting pressure and flowing pressure of the coating material. The mold-clamping force used in the second step is substantially the same as that used in the third step.

This aspect is referred to as a third aspect of the present invention. In this aspect, the mold-clamping forces used in the second and third steps are preferably substantially the same. The pressure of the mold-clamping force in the third step on the coating material per unit area preferably ranges from 1 to 20 MPa, more preferably from 1 to 10 MPa. In addition, the mold-clamping force used in the second step is preferably smaller than that used in the first step, more preferably 10% to 50% of that used in the first step, still more preferably 10% to 25%.

The present invention further provides another in-mold coating method in which a resin molded product is molded and coated in a mold cavity formed between female and male molds. This method includes a first step of charging molten resin into the mold cavity, a second step of molding the resin molded product after the charge of the molten resin into the mold cavity by reducing the volume of the mold cavity in accordance with the thermal contraction of the molten resin to shape the molten resin, and a third step of injecting a coating material between the resin molded product and the surface of the mold cavity when the resin molded product solidifies to the extent to which the product can withstand the injecting pressure and flowing pressure of the coating material. The mold-clamping force used in the second step is smaller than that used in the first step.

This aspect is referred to as a fourth aspect of the present invention. In this aspect, the mold-clamping force used in the second step preferably is 10% to 50%, preferably 10% to 25%, of that used in the first step. The mold-clamping force used in the second step preferably ranges from 2 to 15 MPa, more preferably from 4.0 to 10 MPa, in terms of in-mold pressure per unit area.

The present invention further provides an in-mold-coated molded product formed according to any one of the first to fourth aspects described above.

In the present invention, substantially the same mold-clamping force means that the difference in mold-clamping force in terms of in-mold pressure obtained by dividing mold-clamping force by the projected area of a mold cavity is 5 MPa or less, preferably 3 MPa or less, more preferably 1 MPa or less.

In the first to fourth aspects of the present invention, the first step includes moving a moving mold to a position at which the mold forms a cavity with a predetermined volume, injecting the molten resin into the cavity with an injection machine, and further moving the moving mold to a desired position after the completion of the injection.

In the first and second aspects of the present invention, the second step includes molding the resin molded product after the charge of the molten resin into the mold cavity by reducing the volume of the mold cavity in accordance with the thermal contraction of the injected molten resin by cooling to shape the injected and solidified resin.

In the first and second aspects of the present invention, the third step, on the completion of the second step, includes forming a gap between the resin molded product and the surface of the mold cavity by moving the moving mold to slightly open the mold when the resin molded product solidifies to the extent to which the product can withstand the injecting pressure and flowing pressure of the coating material.

In the third and fourth aspects of the present invention, the third step, on the completion of the second step, includes solidifying the resin molded product to the extent to which the product can withstand the injecting pressure and flowing pressure of the coating material, and then injecting the coating material between the resin molded product and the surface of the mold cavity while keeping the state.

In the first and second aspects of the present invention, the fourth step includes injecting the coating material into the gap formed in the third step, clamping the mold again, and curing the coating material in that state.

Figure 1:
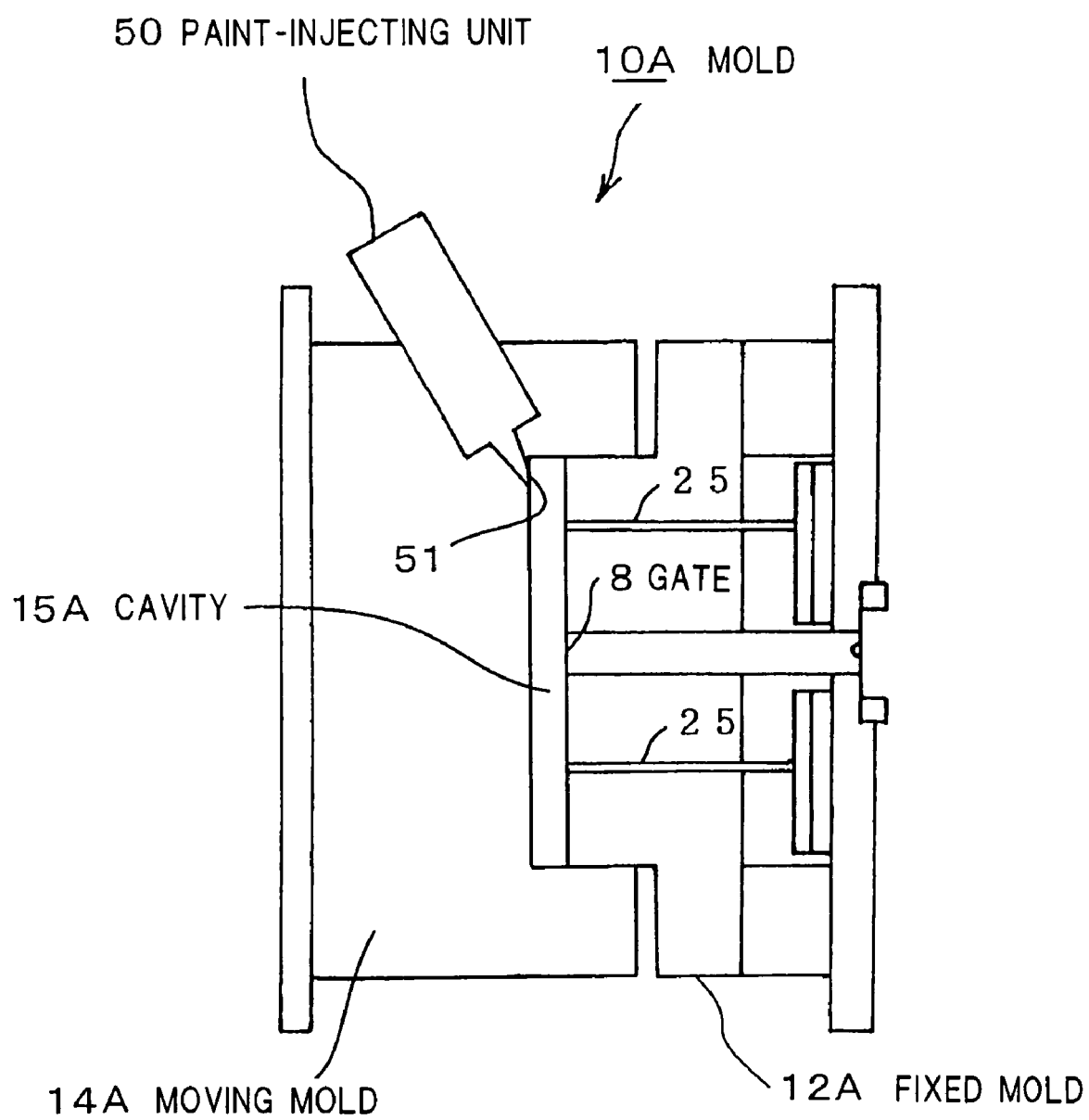
FIG. 1 is a schematic diagram illustrating the structure of a mold for in-mold coating according to a first embodiment of the present invention.

Reference numerals used in the attached drawings indicate the following machines, components, parts, etc.:

10 and 10A: Mold for in-mold coating
12 and 12A: Fixed mold
14 and 14A: Moving mold
15 and 15A: Mold cavity
20: Mold-clamping machine
30: Injection machine
50: Paint-injector
51: Paint inlet
60: Control device
100: Injection apparatus

BEST MODE FOR CARRYING OUT THE INVENTION

In-mold coating methods according to preferred embodiments of the present invention will now be described with reference to the drawings.

Figure 2A:
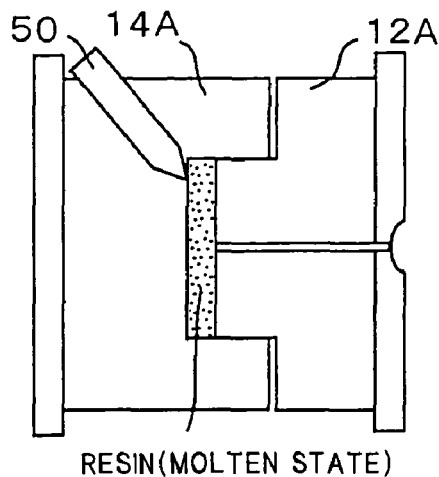
FIGS. 2(a) to 2(d) are schematic diagrams illustrating the behaviors of the mold, resin, and paint in an in-mold coating method according to the first embodiment of the present invention.
Figure 2B:
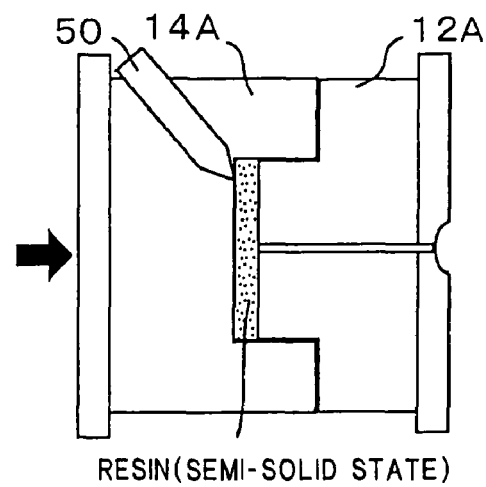
Figure 2C:
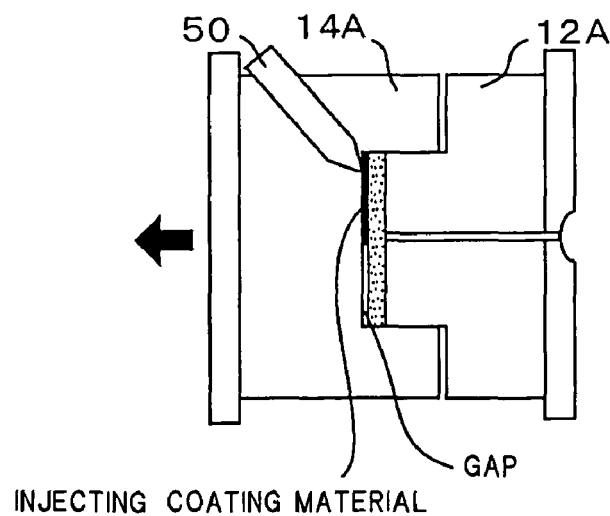
Figure 2D:
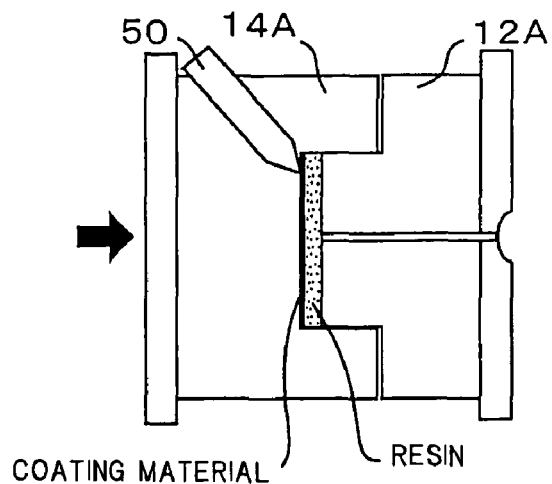
Figure 3:
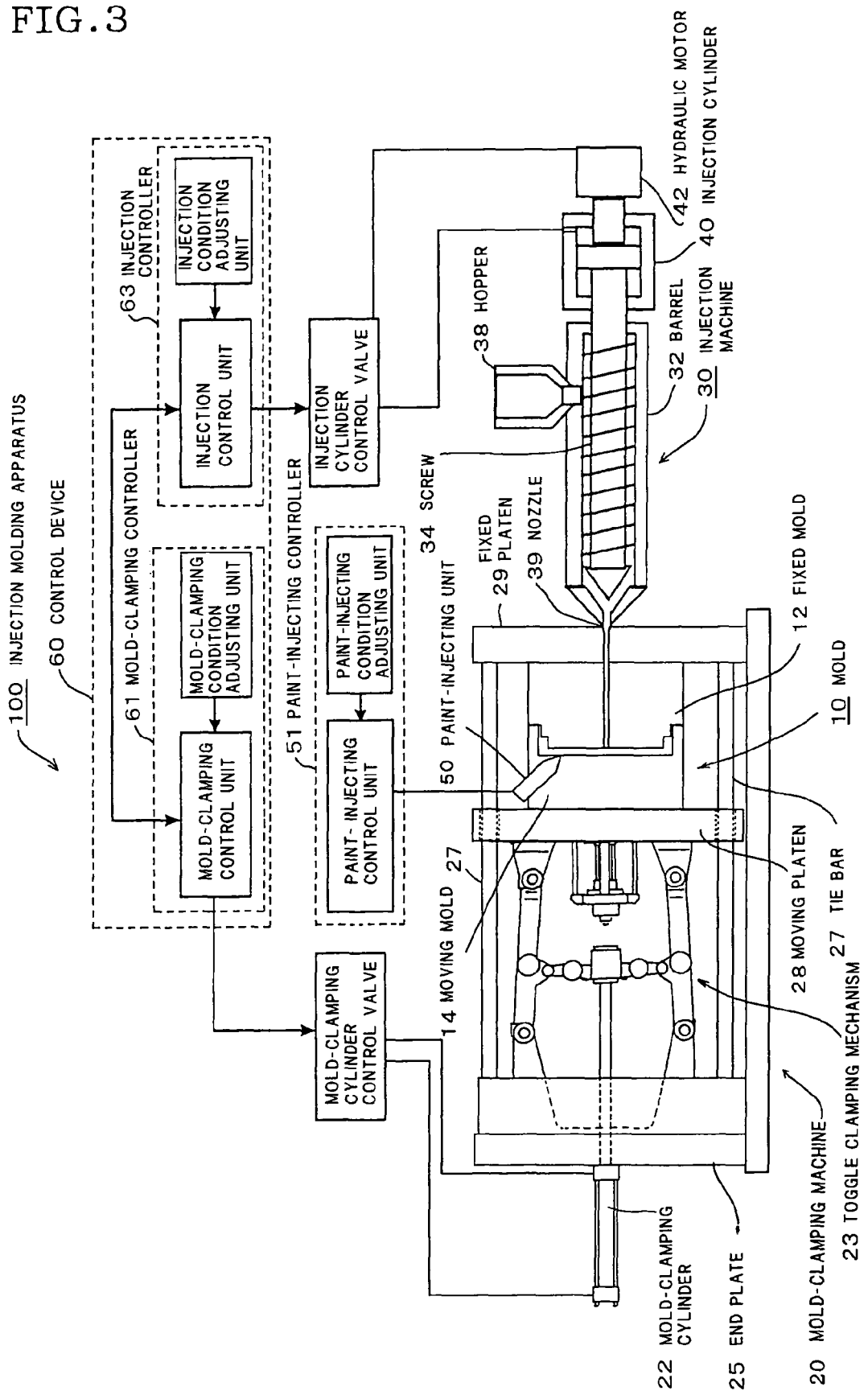
FIG. 3 is an overall schematic view showing the overall structure of an in-mold coating apparatus used in the present invention.

FIGS. 1 to 3 relate to a first embodiment of the present invention. FIG. 1 is a schematic diagram illustrating the structure of a mold for in-mold coating according to this embodiment. FIGS. 2(a) to 2(d) are schematic diagrams illustrating the behaviors of the mold, resin, and paint in an in-mold coating method according to this embodiment. FIG. 3 is an overall schematic view showing the overall structure of an in-mold coating apparatus used in this embodiment.

Figure 4:
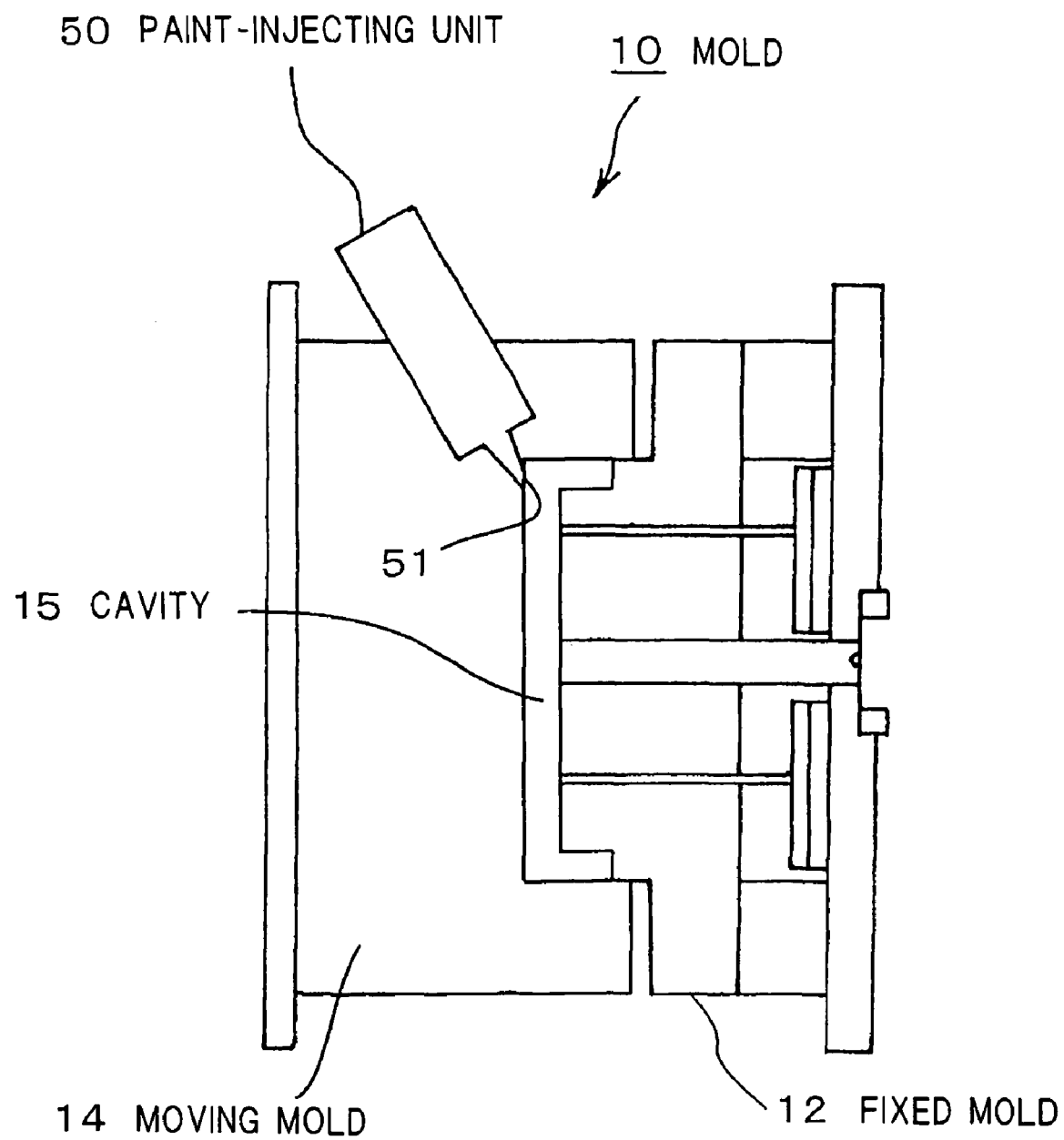
FIG. 4 is a schematic diagram illustrating the structure of a mold for in-mold coating according to a second embodiment of the present invention.
Figure 6:
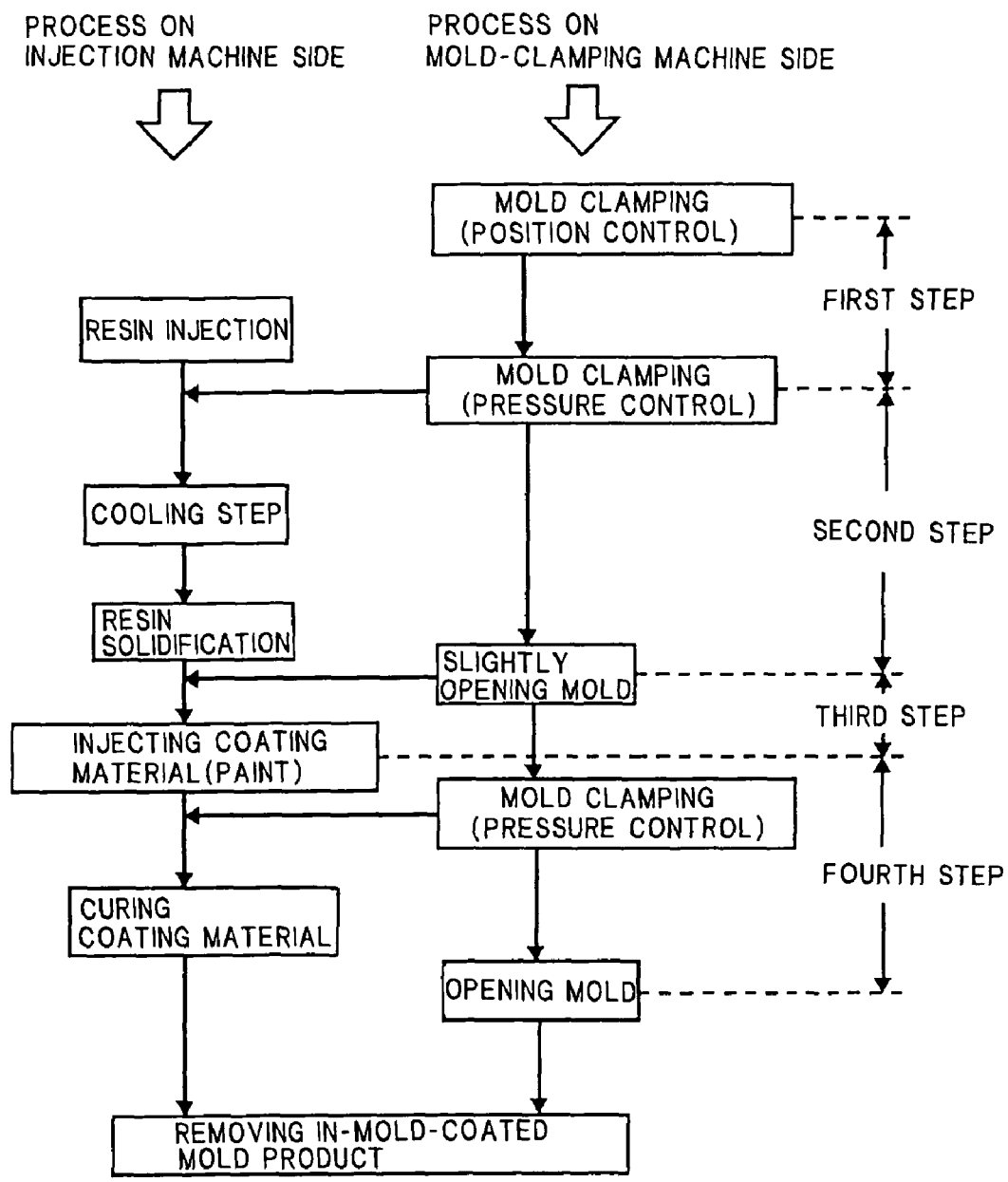
FIG. 6 is a flow chart of the in-mold coating methods according to the first and second embodiments of the present invention.
Figure 7:
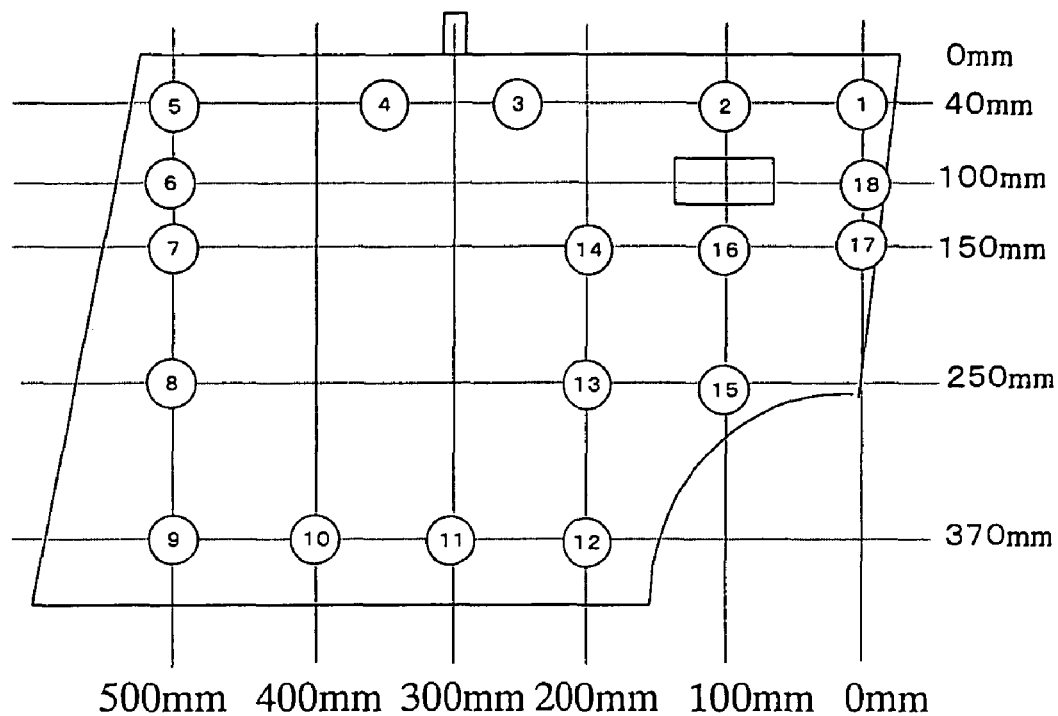
FIG. 7 is a projection view of resin molded products molded in Examples 1 to 3 of the present invention and Comparative Examples 1 to 3 in a mold opening/closing direction, showing measurement points of coating thickness.
Figure 8:
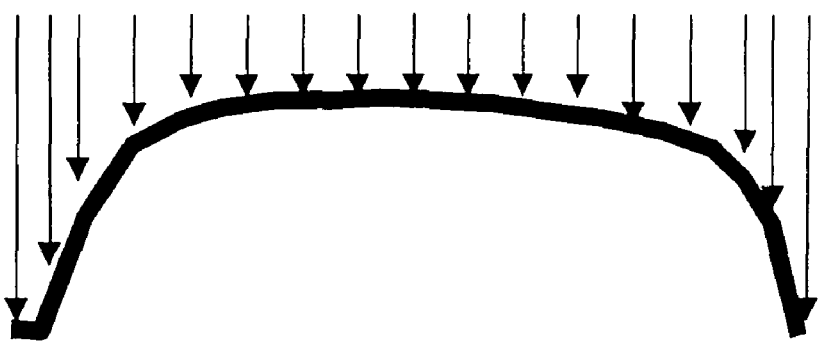
FIG. 8 is a sectional view of resin molded products molded in Example 8 of the present invention and Comparative Example 6, in which arrows indicate the measurement points of coating thickness.
Figure 9:
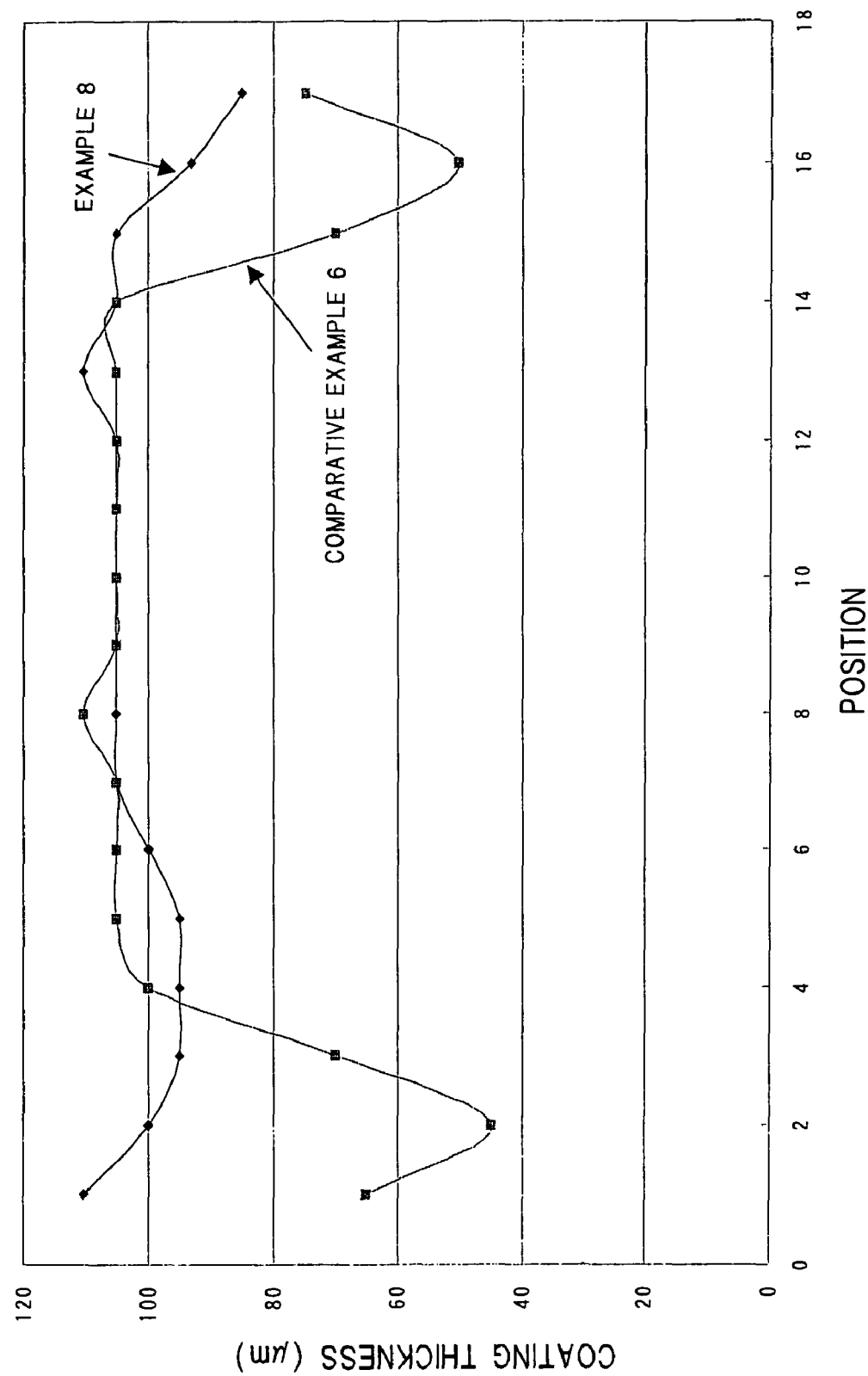
FIG. 9 is a graph showing variations in coating thickness ($\mu m$) at the measurement points of the resin molded products molded in Example 8 of the present invention and Comparative Example 6.
Figure 10A:
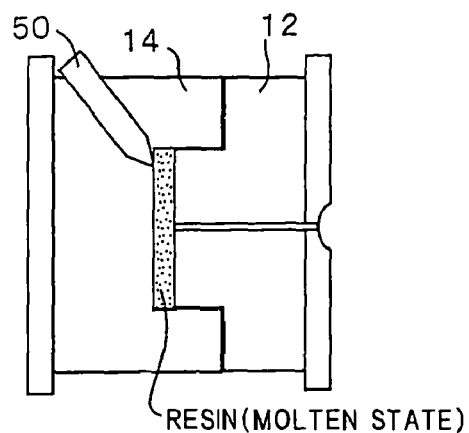
FIGS. 10(a) to 10(d) are schematic diagrams illustrating the behaviors of a mold, resin, and paint in a know method.
Figure 10B:
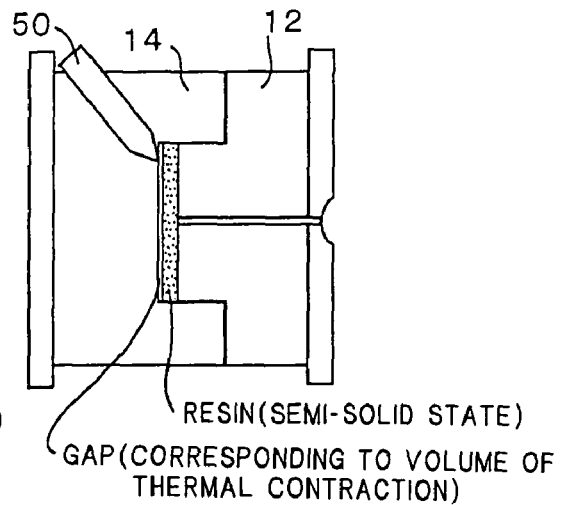
Figure 10C:
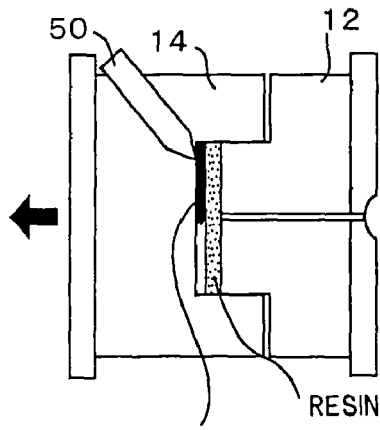
Figure 10D:
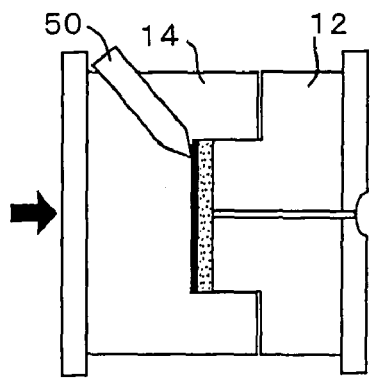
Figure 11A:
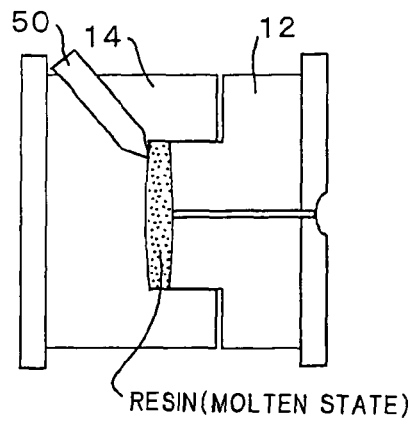
FIGS. 11(a) to 11(d) are schematic diagrams illustrating the behaviors of a mold, resin, and paint in another known method.
Figure 11B:
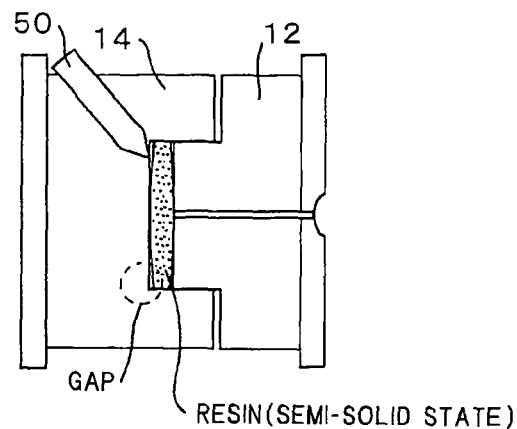
Figure 11C:
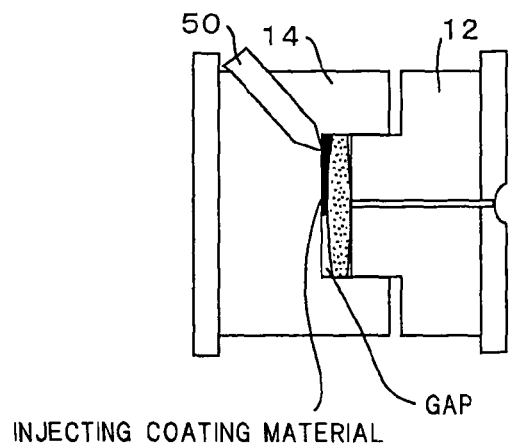
Figure 11D:
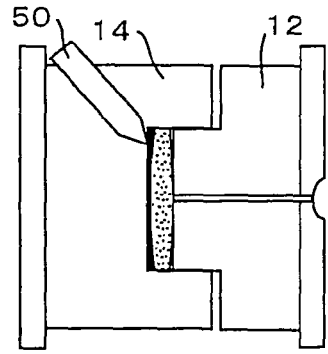
Figure 12:
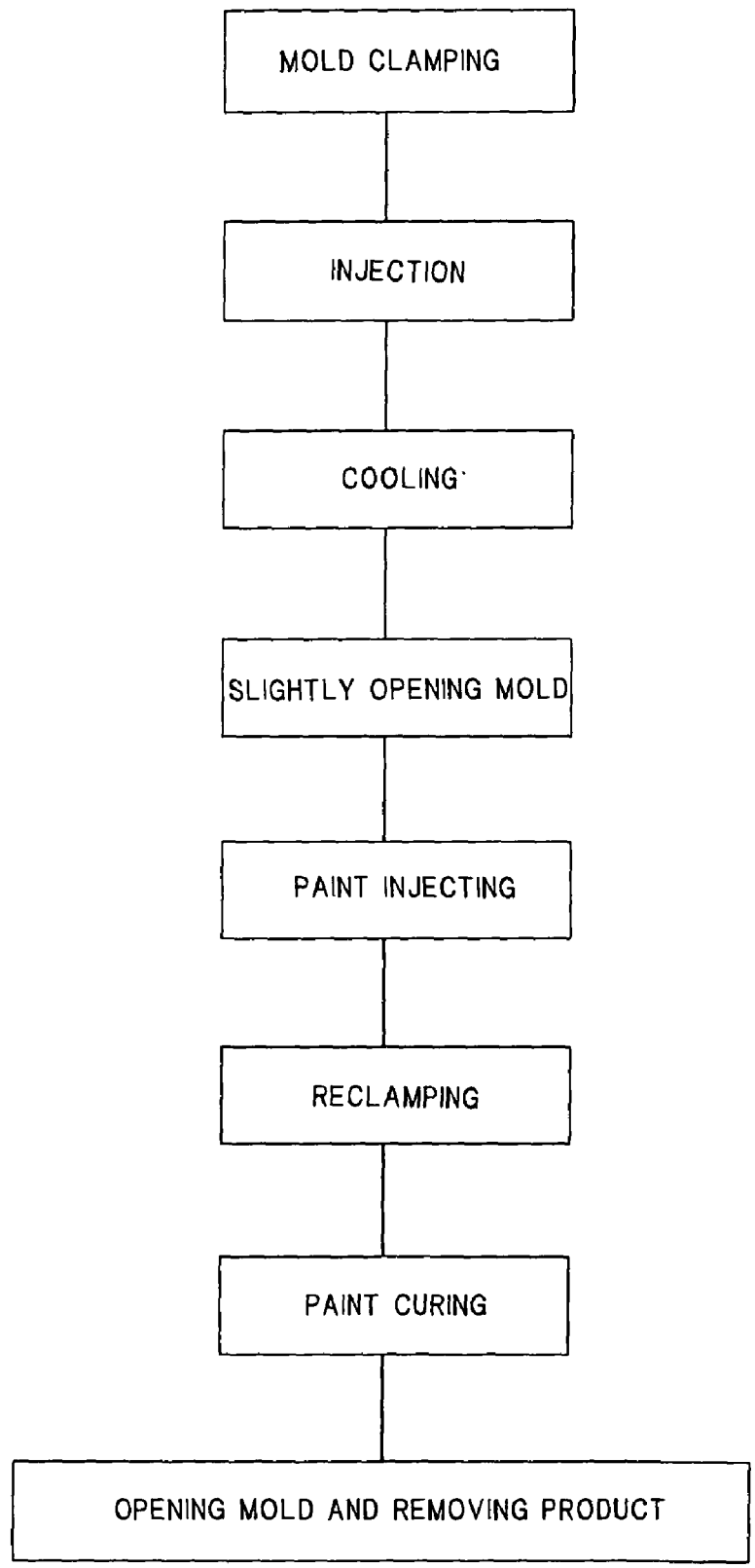
FIG. 12 is a flow chart of a known in-mold coating method.

FIGS. 4 and 5(a) to 5(d) relate to a second embodiment of the present invention. FIG. 4 is a schematic diagram illustrating the structure of a mold for in-mold coating according to a second embodiment of the present invention. FIGS. 5(a) to 5(d) are schematic diagrams illustrating the behaviors of the mold, resin, and paint in an in-mold coating method according to the second embodiment. FIG. 6 is a flow chart of the in-mold coating methods according to the first and second embodiments of the present invention. FIG. 7 is a projection view of resin molded products molded in Examples 1 to 3 of the present invention and Comparative Examples 1 to 3 in a mold opening/closing direction, showing measurement points of coating thickness. FIG. 8 is a sectional view of resin molded products molded in Example 8 of the present invention and Comparative Example 6, in which arrows indicate the measurement points of coating thickness. FIG. 9 is a graph showing variations in coating thickness ($\mu m$) at the measurement points of the resin molded products molded in Example 8 of the present invention and Comparative Example 6. FIGS. 10(a) to 10(d) and 11(a) to 11(d) are schematic diagrams illustrating the behaviors of a mold, resin, and paint in known methods. FIG. 12 is a flow chart of a known in-mold coating method.

The structure of a preferred example of an in-mold coating mold 10A (which may also be referred to as a mold 10A) according to the first embodiment of the present invention is briefly described below with reference to FIG. 1.

The mold 10A according to the present invention has a moving mold 14A, a fixed mold 12A, and a paint-injector 50. In the embodiment shown in FIG. 1, the moving mold 14A is a female mold, and the fixed mold 12A is a male mold. A mold cavity 15A is flat, as shown in the sectional view of FIG. 1.

Next, the paint-injector 50 is briefly described below. In this embodiment, the paint-injector 50 is attached to the moving mold 14A so as to inject paint into the mold cavity 15A through a paint inlet 51 provided at the mold cavity surface of the moving mold 14A. A valve (not illustrated) is attached to the paint inlet 51 of the paint-injector 50. In injection molding, this valve is closed to prevent resin injected into the mold cavity 15A of the mold 10A from entering the paint-injector 50 through the paint inlet 51.

The paint-injector 50 according to this embodiment is driven by a drive unit (not illustrated) to accurately inject a desired amount of paint fed into the paint-injector 50 from the mold cavity surface of the moving mold 14A.

Though, as described above, the paint-injector 50 in this embodiment injects paint from the mold cavity surface of the moving mold 14A, the present invention is not limited to the above structure. The paint-injector 50 may be, for example, attached to the fixed mold 12A as long as the paint can be injected into a gap between a resin molded product formed in the mold cavity 15A and the mold cavity surface.

A preferred example of an in-mold coating method according to this embodiment will now be described with reference to FIGS. 1 to 3 and 6.

As a first step, the mold 10A is opened by a mold-clamping machine 20 to form the mold cavity 15A. This mold cavity 15A has a larger volume than a resin molded product described later by the volume of thermal contraction of molten resin.

The mold 10A requires such a structure that the volume of the mold cavity 15A can be reduced by the volume of thermal contraction of molten resin in the subsequent step. The fixed mold 12A and the moving mold 14A must be arranged so that the volume of the mold cavity 15A can be reduced by the volume of thermal contraction after the injection of molten resin using, for example, the above mold shown in FIG. 1, which has a fit portion with a pinch-off structure.

After the mold cavity 15A, which has a larger volume than the desired resin molded product by the volume of thermal contraction of molten resin, is formed, a molten thermoplastic resin is injected as a base material into the mold cavity 15A with an injection machine 30 (not illustrated), as shown in FIG. 2(a) (the base material used in this embodiment is a heat-resistant ABS resin, namely UT20B, manufactured by UMG ABS, Ltd.). In this embodiment, when the molten resin is charged, the hydraulic pressure of a mold-clamping cylinder 22 (not illustrated) provided to a toggle clamping mechanism 23 (not illustrated) is controlled so that the position of a moving platen 28 (not illustrated) is kept unchanged during the injection to minimize variations in the volume of the mold cavity 15A.

The maximum mold-clamping force Pmax required for keeping the position of the moving platen 28 substantially unchanged is divided by the projected area S of the resin molded product in a mold opening/closing direction to determine a surface pressure Mmax per unit area, as represented by the following formula 1:

$$Mmax = Pmax/S$$

The surface pressure Mmax is determined to be 50 MPa (megapascals). In general, the surface pressure Mmax is at least 30 MPa or more except for some injection compression methods or injection pressing methods called low-pressure molding, though the value depends on many factors such as the shape and size of the molded product, the type of resin, and melting temperature.

In this embodiment, the position of the moving platen 28 is controlled so as to minimize variations in the volume of the mold cavity 15A. However, the mold-clamping manner in the first step which is applicable to the present invention the first step is not limited to the above-mentioned mold-clamping manner. One may control the mold-clamping machine so as to increase the volume of the mold cavity 15A by opening the mold 10A with the charging pressure of the molten resin during the charge of the molten resin, alternatively.

In a second step after the completion of the injection of the molten resin into the mold cavity 15A, the molten resin is cooled and solidified to the extent to which the resin can withstand the injecting pressure of a coating material described later. Immediately after the completion of the injection of the molten resin, the volume of the mold cavity 15A is at least larger than that of the resin molded product described later by the volume of thermal contraction of the molten resin. In this embodiment, the mold-clamping force in the second step is changed to 1,000 kN (kilo-newtons) from the one used in the first step. Thus, the surface pressure per unit area becomes 5 MPa, which is obtained by dividing the mold-clamping force by the projected area S of the resin molded product (2,000 cm² in the first embodiment).

When clamped in this state, the mold 10A is closed gradually in accordance with the thermal contraction of the molten resin in the mold cavity 15A, and the molten resin is shaped.

Referring to FIG. 2(c), in a third step after the cooling of the base material, the mold is slightly opened (the moving mold 14A is moved in the mold-opening direction by about 1 mm in the first embodiment) to form a gap between the resin molded product formed in the mold cavity 15A and the mold cavity surface of the moving mold 14A.

After the gap is formed, 20 mL of paint is injected into the mold cavity 15A through the paint inlet 51 by the paint-injector 50. The paint then starts to flow into the gap formed by opening the mold 10A. The area of the coating surface of the molded product formed with the mold used in this embodiment is 2,000 cm², and the coating thickness is about 0.1 mm. The paint used in the first embodiment is Plaglass #8,000 white (manufactured by Dai Nippon Toryo Co., Ltd.).

Referring to FIG. 2(d), in a fourth step after the paint injecting, the mold 10A is closed and clamped again by moving the moving mold 14A toward the fixed mold 12A to allow the paint to spread and flow in the gap, thus coating the molded product with the paint.

In the first embodiment, the mold-clamping force in the fourth step is 1,000 kN, and the surface pressure (which may also be referred to as in-mold pressure per unit area) obtained by dividing the mold-clamping force by the projected area S of the resin molded product is 5 MPa.

Advantages of the in-mold coating method according to the first embodiment are described below. In the first embodiment, the volume of the mold cavity 15A is reduced in accordance with the thermal contraction of the molten resin in the second step, so that most of the coating surface of the resin molded product is kept pressed against the mold cavity surface until immediately before coating. By molding the resin molded product in this state, the surface profile of the mold cavity can be precisely transferred to the surface of the resin molded product. This method can therefore prevent the conventional problem of a nonuniform coating thickness effectively.

In this embodiment, additionally, the mold-clamping force in the second step, in which the shape of the resin molded product is fixed, and that in the fourth step are selected so that the forces are substantially the same.

As described in the section of Background Art, a nonuniform coating thickness is caused by mold deformation in molding.

Substantially the same mold-clamping force may be used in the second and fourth steps so that the mode and degree of deformation of the mold cavity 15 in the second step are close to those of the mold cavity 15 in the fourth step.

This method has the excellent effect, even if the mold cavity 15 deforms to some degree by the mold-clamping force in the second step, since the mold cavity 15 also deforms similarly in the fourth step to provide a uniform coating thickness.

Accordingly, the above effect is produced and enhanced as the mold-clamping forces in the second and fourth steps approach each other. The mold-clamping forces in the second and fourth steps are therefore preferably substantially the same, namely 5 MPa or less in terms of the difference in surface pressure (the pressure per unit area obtained by dividing mold-clamping force by the projected area S of the resin molded product) between the second and fourth steps, more preferably 3 MPa or less, most preferably 1 MPa or less.

In addition, the pressure of the mold-clamping force in the fourth step on the coating material per unit area preferably ranges from 1 to 20 MPa, more preferably from 1 to 10 MPa. Excessive reclamping force after the paint injecting undesirably causes, for example, a phenomenon called a hump at a thick portion such as a rib and a boss.

Next, a second embodiment of the present invention will now be described. The following description focuses on parts different from the embodiment described above.

The structure of an in-mold coating mold 10 (which may also be referred to as a mold 10) according to the second embodiment of the present invention is briefly described below with reference to FIG. 4.

As in the case of the mold 10A used in the first embodiment described above, the mold 10 according to the present invention has a moving mold 14, a fixed mold 12, and a paint-injector 50. The fixed mold 12 and the moving mold 14 are fitted at a fit portion with a pitch-off structure. A pitch-off portion is formed all around a mold cavity 15. The mold cavity 15 of the mold 10 is box-shaped, having a sidewall portion extending in a mold closing direction on the periphery of the mold cavity 15 and an opening, as shown in the sectional view of FIG. 4. The fixed mold 12, which is a male mold, and the moving mold 14, which is a female mold, are fitted at the fit portion with the pitch-off structure to form the mold cavity 15A inside the mold 10. The fit portion with the pitch-off structure (which may also be referred to as a pitch-off portion) is formed all around the mold cavity 15.

The pinch-off portion of the mold 10 can prevent the resin charged into the mold cavity 15 from leaking from the mold 10.

The arrangement and structure of the paint-injector 50 are not described since they are the same as in the embodiment described above.

An in-mold coating method according to the second embodiment of the present invention will now be described with reference to FIGS. 5(a) to 5(d). In the in-mold coating method according to the second embodiment, as a first step, the mold 10 is opened by a mold-clamping machine 20 to form the mold cavity 15. As in the first embodiment described above, the mold cavity 15 has a larger volume than a resin molded product by the volume of thermal contraction of molten resin. Subsequently, as is done in the first embodiment, a heat-resistant ABS resin is injected into the mold cavity 15, and the operation proceeds to the second step wherein the mold 10 is gradually closed in accordance with the thermal contraction of the molten resin in the mold cavity 15.

In this embodiment, the mold-clamping force in the second step is significantly reduced compared with that in the first step to make smaller the surface pressure per unit area obtained by dividing the mold-clamping force by the projected area S of the resin molded product. That is, the mold-clamping force in the second step is preferably 10% to 50%, more preferably 10% to 25%, of that in the first step. In this embodiment, the surface pressure M2 in the second step is 5 MPa, which is equivalent to 10% of the surface pressure M1 in the first step.

Figure 5A:
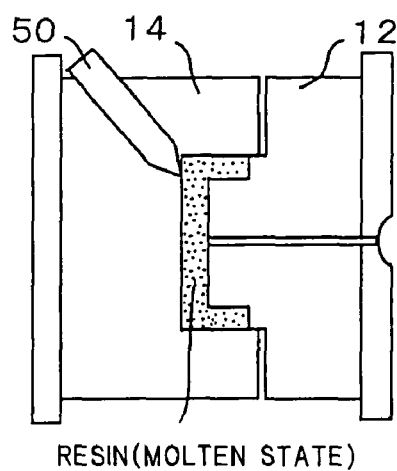
FIGS. 5(a) to 5(d) are schematic diagrams illustrating the behaviors of the mold, resin, and paint in an in-mold coating method according to the second embodiment of the present invention.
Figure 5B:
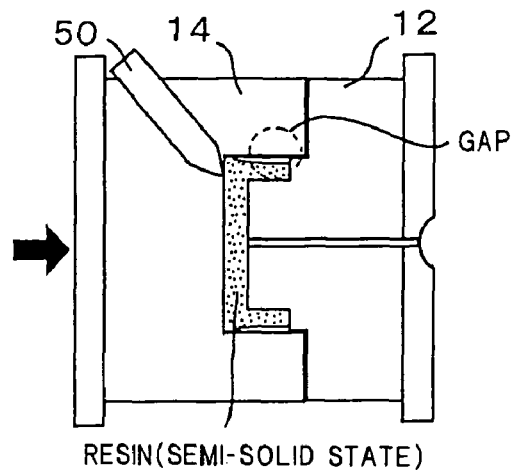
Figure 5C:
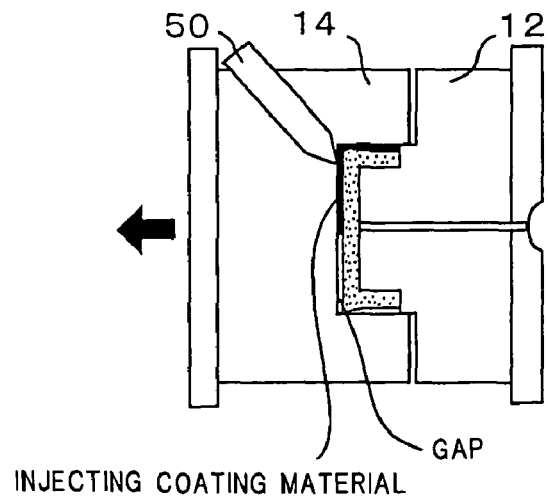

Referring to FIG. 5(c), in a third step after the cooling of the base material, the mold is slightly opened (the moving mold 14 is moved in the mold-opening direction by about 1 mm in this embodiment) to form a gap between the resin molded product formed in the mold cavity 15 and the mold cavity surface of the moving mold 14.

After the gap is formed, 25 mL (milliliters) of coating material is injected into the mold cavity 15 through the paint inlet 51 by the paint-injector 50. The coating material then starts to flow into the gap formed by opening the mold 10 and a gap formed at the sidewall portion.

The area of the coating surface of the molded product formed with the mold used in this embodiment is 2,500 cm$^2$, and the coating thickness is about 0.1 mm. The coating material used in this embodiment is Plaglass #8,000 white (manufactured by Dai Nippon Toryo Co., Ltd.).

Figure 5D:
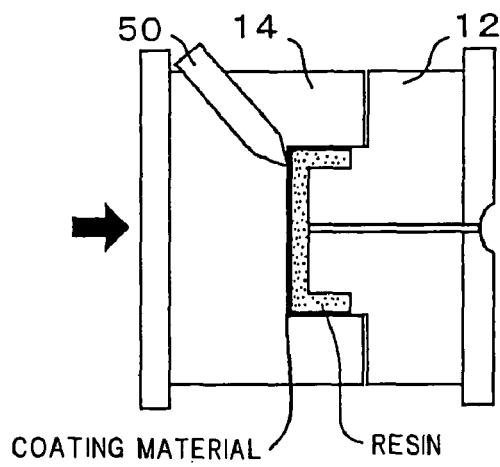

Referring to FIG. 5(d), in a fourth step after the injecting of the coating material (paint), the mold 10 is closed and clamped again by moving the moving mold 14 toward the fixed mold 12 to allow the coating material to spread and flow in the gap, thus coating the molded product with the coating material.

In this embodiment, a surface pressure M3 per unit area obtained by dividing the mold-clamping force in the fourth step by the projected area S of the resin molded product is selected so that the deformation of the mold cavity is substantially the same in the second and fourth steps, preferably so that the surface pressures in the second and fourth steps are substantially the same. In this embodiment, the surface pressure M3 used in the fourth step is 5 MPa, which is the same as that in the second step.

Advantages of the in-mold coating method according to this embodiment are described below. In this embodiment, the volume of the mold cavity 15 is reduced in accordance with the thermal contraction of the molten resin in the second step, so that the resin molded product is kept pressed against the mold cavity surface until immediately before coating.

By molding the resin molded product in this state, the surface profile of the mold cavity can be precisely transferred to the surface of the resin molded product. The resultant product has a clear surface and almost no thin part due to, for example, thermal contraction. This method can therefore prevent the conventional problem of a nonuniform coating thickness resulting from a decrease in the thickness of the resin molded product by thermal contraction effectively.

In this embodiment, additionally, the mold-clamping force in the second step, in which the shape of the resin molded product is fixed, is significantly reduced compared with that in the first step. As is discussed in the description of the problems to be solved, another cause of a nonuniform coating thickness is mold deformation in molding. The degree of deformation of the mold 10 is usually designed according to the mold-clamping force Pmax in the first step. If, therefore, the mold-clamping force in the second step is smaller than that in the first step, the effect of suppressing the deformation of the mold 10 can be achieved to provide a uniform coating thickness.

A preferred range of mold-clamping force in the second step, namely the range effective in practical molding, is 50% or less of the mold-clamping force in the first step.

In addition, the reduction of the mold-clamping force in the second step allows a slight gap to occur gradually by thermal contraction at the sidewall portion of the resin molded product. As a result, the coating material can flow to the sidewall portion to form an excellent coating.

As described above, the mold-clamping force Pmax in the first step is designed according to the surface pressure, namely the pressure on the resin molded product per unit area. The mold-clamping force Pmax in the first step is usually adjusted to 30 MPa or more in terms of surface pressure. Accordingly, the pressure of the mold-clamping force in the second step on the resin molded product per unit area is preferably 15 MPa or less, and is more preferably 10 MPa or less in view of enhancing the effects. In addition, the surface pressure is also required for keeping the resin molded product pressed against the mold cavity surface until immediately before coating. The mold-clamping force in the second step therefore preferably ranges from 2 to 15 MPa, more preferably from 4 to 10 MPa, in terms of in-mold pressure per unit area.

In addition, the pressure of the mold-clamping force in the fourth step on the coating material per unit area preferably ranges from 1 to 20 MPa, more preferably from 1 to 10 MPa. Excessive reclamping force after the paint injecting undesirably causes, for example, a phenomenon called a hump at a thick portion such as a rib and a boss.

An in-mold coating method according to a third embodiment will now be described with reference to FIG. 2(a) to 2(d) for reference.

Referring to FIG. 2(a), as a first step, the mold 10A is opened by the mold-clamping machine 20 (not illustrated) to form the mold cavity 15A. As in the embodiments described above, this mold cavity 15A has a larger volume than a resin molded product by the volume of thermal contraction of molten resin.

After the mold cavity, which has a larger volume than the resin molded product by the volume of thermal contraction of the molten resin, is formed, a molten thermoplastic resin is injected as a base material into the mold cavity 15A with the injection machine 30 (not illustrated in FIG. 2) (the base material used in the third embodiment is a heat-resistant ABS resin, namely UT20B, manufactured by UMG ABS, Ltd.).

The mold-clamping force used in the resin injection is 3,000 kN.

Referring to FIG. 2(b), in a second step after the completion of the injection of the molten resin into the mold cavity 15A, the molten resin is cooled and solidified to the extent to which it can withstand the injecting pressure of the coating material described later. Here, the volume of the mold cavity 15A immediately after the completion of the injection of the molten resin is larger than that of the resin molded product described later at least by the volume of thermal contraction of the molten resin.

In the third embodiment, additionally, the mold-clamping force in the second step is changed to 1,000 kN from the one in the first step. The surface pressure per unit area is 5 MPa, which is obtained by dividing the mold-clamping force by the projected area S of the resin molded product (2,000 cm$^2$ in the third embodiment). When clamped in this state, the mold 10A closes gradually in accordance with the thermal contraction of the molten resin in the mold cavity 15A to shape the molten resin.

In a third step after the cooling of the base material, 20 mL of paint is injected into the mold cavity 15A through the paint inlet 51 by the paint-injector 50.

The paint is injected with higher pressure to slightly open the mold 10A by the paint-injecting pressure so that the paint can flow into the mold cavity 15A to coat the molded product with the paint. The area of the coating surface of the molded product formed with the mold used in the third embodiment is 2,000 cm$^2$, and the coating thickness is about 0.1 mm. The paint used in this embodiment is Plaglass #8,000 white (manufactured by Dai Nippon Toryo Co., Ltd.). In the third embodiment, the mold-clamping force in the third step is 1,000 kN, and the surface pressure per unit area is 5 MPa, which is obtained by dividing the mold-clamping force by the projected area S of the resin molded product.

An in-mold coating method according to a fourth embodiment will now be described with reference to FIG. 2(a) to 2(d) for reference.

Referring to FIG. 2(a), as a first step, the mold 10A is opened by the mold-clamping machine 20 (not illustrated) to form the mold cavity 15A. As in the embodiments described above, this mold cavity 15A has a larger volume than a resin molded product by the volume of thermal contraction of molten resin.

After the mold cavity 15A, which has a larger volume than the resin molded product by the volume of thermal contraction of the molten resin, is formed, a molten thermoplastic resin is injected as a base material into the mold cavity 15A with the injection machine 30 (not illustrated) (the base material used in the fourth embodiment is a heat-resistant ABS resin, namely UT20B, manufactured by UMG ABS, Ltd.).

The mold-clamping force used in the resin injection is 3,000 kN.

Referring to FIG. 2(b), in a second step after the completion of the injection of the molten resin into the mold cavity 15A, the molten resin is cooled and solidified to the extent to which it can withstand the injecting pressure of the coating material described later. Here, the volume of the mold cavity 15A immediately after the completion of the injection of the molten resin is larger than that of the resin molded product described later at least by the volume of thermal contraction of the molten resin.

In the fourth embodiment, additionally, the mold-clamping force in the second step is changed to 1,000 kN from the one in the first step. The surface pressure per unit area is 5 MPa, which is obtained by dividing the mold-clamping force by the projected area S of the resin molded product (2,000 cm$^2$ in the fourth embodiment). When clamped in this state, the mold 10A closes gradually in accordance with the thermal contraction of the molten resin in the mold cavity 15A to shape the molten resin. For the same reason as in the embodiments described above, the mold-clamping force in the second step is preferably 15 MPa or less in terms of in-mold pressure per unit area, and is more preferably 10 MPa or less in view of enhancing the effects. In addition, preferably, the mold-clamping force in the second step ranges from 2 to 15 MPa in terms of in-mold pressure per unit area.

In a third step after the cooling of the base material, 20 mL of paint is injected into the mold cavity 15A through the paint inlet 51 by the paint-injector 50.

The paint is injected with higher pressure to slightly open the mold 10A by the paint-injecting pressure so that the paint can flow into the mold cavity 15A to coat the molded product with the paint. The area of the coating surface of the molded product formed with the mold used in the fourth embodiment is 2,000 cm$^2$, and the coating thickness is about 0.1 mm. The paint used in this embodiment is Plaglass #8,000 white (manufactured by Dai Nippon Toryo Co., Ltd.). In the fourth embodiment, the mold-clamping force in the third step is 2,000 kN, and the surface pressure per unit area is 10 MPa, which is obtained by dividing the mold-clamping force by the projected area S of the resin molded product.

According to the third and fourth embodiments, the same effects as in the first and second embodiments can be achieved for the same reasons as in the first and second embodiments.

As described above, the present invention may be applied not only to methods in which paint is injected into a mold opened in advance, but also to methods in which a mold is opened by paint-injecting pressure, as shown in the third and fourth embodiments. The same effects as in the first and second embodiments can be achieved for the same reasons as in the first and second embodiments.

The present invention will be further described below with examples, though they do not limit the scope of the present invention.

Examples 1 to 3 and Comparative Examples 1 to 3

A heat-resistant ABS resin (UT20B, manufactured by UMG ABS, Ltd.) was molded in a mold having a projected shape shown in FIG. 7 and a projected area of about 2,400 cm$^2$ with varying mold-clamping forces in the second step. Table 1 shows the measurement results of the thickness of the molded products. In FIG. 7, circled numbers indicate measurement points.

TABLE 1

Molded product thickness

Examples/Comparative examples

|  | Comparative Example 1 | Comparative Example 2 | Example 1 | Example 2 | Example 3 | Comparative Example 3 |
|---|---|---|---|---|---|---|
| Mold-clamping force in first step (ton) | 850 | 850 | 850 | 850 | 850 | 850 |
| Mold-clamping force in second step (ton) | 850 | 400 | 300 | 200 | 100 | 50 |
| Maximum thickness (mm) | 3.262 | 3.186 | 3.257 | 3.240 | 3.243 | — |
| Minimum thickness (mm) | 3.050 | 2.988 | 3.141 | 3.154 | 3.164 | — |
| Difference between maximum and minimum thicknesses | 0.212 | 0.198 | 0.116 | 0.086 | 0.079 | — |
| Average | 3.15 | 3.11 | 3.20 | 3.21 | 3.21 | — |
| Standard deviation | 0.058 | 0.058 | 0.038 | 0.035 | 0.029 | — |
| Surface condition | Good | Good | Good | Good | Good | Sink marks occurred |

The molded products of Comparative Examples 1 and 2, in which the mold-clamping force in the second step exceeded 50% of that (850 tons) in the first step, had large variations in thickness. On the other hand, the molded products of Examples 1 to 3, in which the mold-clamping force in the second step was within the range of 10% to 50% of that in the first step, had smaller variations in thickness. In Comparative Example 3, in which the mold-clamping force in the second step was below 10% of that in the first step, sink marks occurred obviously on the surface of the molded product.

Examples 4 to 7 and Comparative Examples 4 to 5

In-mold coating was performed in the same mold using a heat-resistant ABS resin (UT20B, manufactured by UMG ABS, Ltd.) and paint (Plaglass #8,000 red, manufactured by Dai Nippon Toryo Co., Ltd.) with varying mold-clamping forces in the second and fourth steps. Table 2 shows the measurement results of the thickness of the molded products.

In Comparative Examples 4 and 5, the difference in mold-clamping force between the second and fourth steps was 750 tons, which is equivalent to about 30 MPa in terms of in-mold pressure. The difference between the maximum and minimum coating thicknesses was 60 μm or more, indicating that the coating thickness had large variations. In Examples 4 to 6, on the other hand, the mold-clamping forces in the second and fourth steps were controlled so that the forces were substantially the same. The difference in coating thickness ranged from 15 to 20 μm, indicating that a nearly uniform coating was formed. In Example 7, the difference in in-mold pressure was 8 MPa, which was an intermediate value between the examples and the comparative examples.

Example 8 and Comparative Example 6

In-mold coating was performed in a mold with the shape of a side cover (projected area: about 500 cm²) using a heat-resistant ABS resin (UT20B, manufactured by UMG ABS, Ltd.) and paint (Plaglass #8,000 red, manufactured by Dai Nippon Toryo Co., Ltd.) with varying mold-clamping forces in the second and fourth steps, as shown in Table 3 below.

TABLE 2

Molding conditions and coating thickness

Examples/comparative examples

|  | Example 4 | Comparative Example 4 | Comparative Example 5 | Example 5 | Example 6 | Example 7 |
|---|---|---|---|---|---|---|
| Mold-clamping force in first step (ton) | 850 | 850 | 850 | 850 | 850 | 850 |
| Mold-clamping force in second step (ton) | 850 | 850 | 100 | 100 | 200 | 100 |
| In-mold pressure in second step (MPa) | 36 | 32 | 4 | 4 | 8 | 4 |
| Mold-clamping force in fourth step (ton) | 850 | 100 | 850 | 100 | 200 | 300 |
| In-mold pressure in fourth step (MPa) | 36 | 4 | 36 | 4 | 8 | 13 |
| Maximum coating thickness (μm) | 55 | 100 | 100 | 60 | 50 | 70 |
| Minimum coating thickness (μm) | 35 | 40 | 35 | 30 | 35 | 25 |
| Difference (μm) | 20 | 60 | 65 | 20 | 15 | 45 |

FIG. 8 shows measurement points at which the coating thickness of the resultant molded products was measured. The measurement points are indicated by the arrows above the cross section. FIG. 9 shows the variations in coating thickness at the measurement points.

TABLE 3

|  | Example/Comparative example | |
| --- | --- | --- |
|  | Comparative Example 6 | Example 8 |
| Mold-clamping force in first step (ton) | 200 | 200 |
| Mold-clamping force in second step (ton) | 200 | 50 |
| In-mold pressure in second step (MPa) | 41 | 10 |
| Mold-clamping force in fourth step (ton) | 50 | 50 |
| In-mold pressure in fourth step (MPa) | 10 | 10 |
| Difference in in-mold pressure | 31 | 0 |

In Example 8, the mold-clamping force in the second step was smaller than that in the first step. The results in FIG. 9 show that the coating thickness on the elevation surfaces at the ends of the resin molded product is close to that on the flat part of the resin molded product. In Comparative Example 6, in which the mold-clamping force in the second step was the same as that in the first step, the coating was significantly thinner on the elevation surfaces at the ends of the resin molded product than on the flat part of the resin molded product.

INDUSTRIAL APPLICABILITY

In the present invention, the volume of the mold cavity is reduced in accordance with the thermal contraction of the molten resin in the second step, so that the resin molded product is kept pressed against the mold cavity surface until immediately before coating. This allows an excellent transfer of the mold cavity surface to provide a uniform coating on the overall coating surface of the resin molded product.

In the second step, in which the shape of the resin molded product is fixed, the mold-clamping force is significantly reduced in comparison with the first step, namely 50% or less of the mold-clamping force in the first step. This produces the excellent effect of suppressing mold deformation to provide a uniform thickness for the overall coating. In addition, the mold-clamping force in the second step, in which the shape of the resin molded product is fixed, and that in the fourth step are adjusted so that the cavity deformation is substantially the same in these steps. In other words, the same mold-clamping force is used in the second and fourth steps so that the mode and degree of deformation of the mold cavity 15 in the second step are close to those of the mold cavity 15 in the fourth step. This produces the excellent effect that, even if the mold cavity deforms to some degree by mold-clamping force in the second step, the mold cavity also deforms similarly in the fourth step to provide a uniform coating thickness.

In addition, the reduction of the mold-clamping force in the second step allows a slight gap to occur gradually by thermal contraction at the sidewall portion of the resin molded product. As a result, the coating material can flow to the sidewall portion to form an excellent coating. The mold-clamping force in the second step described above is also required for keeping the resin molded product pressed against the mold cavity surface until immediately before coating. The mold-clamping force in the second step therefore preferably ranges from 2 to 15 MPa, more preferably from 4 to 10 MPa, in terms of in-mold pressure per unit area.

The pressure of the mold-clamping force in the fourth step on the coating material per unit area preferably ranges from 1 to 20 MPa, more preferably from 1 to 10 MPa. Excessive reclamping force after paint injecting undesirably causes, for example, a phenomenon called a hump at a thick portion such as a rib and a boss.

Furthermore, the present invention may be applied not only to methods in which paint is injected into a mold opened in advance, but also to in-mold coating methods in which a mold is opened by paint-injecting pressure to achieve the same effects.

The invention claimed is:

1. An in-mold coating method in which a resin molded product is molded and coated in a mold cavity formed between female and male molds, the method comprising:
   a first step of injecting molten resin into a mold cavity with an injection machine;
   a second step of molding a resin molded product after injecting of the molten resin into the mold cavity by reducing a volume of the mold cavity in accordance with a thermal contraction of the molten resin to shape the molten resin;
   a third step of forming a gap for injecting a coating material between a resin molded product and a surface of the mold cavity by slightly opening the mold when the resin molded product solidifies to an extent to which the product can withstand the injecting pressure and flowing pressure of the coating material; and
   a fourth step of injecting the coating material into the gap and clamping the mold again,
   wherein mold-clamping forces in the second and fourth steps are controlled so that the deformation of the mold by clamping is substantially the same in the second and fourth steps, and
   wherein mold-clamping forces used in the second and fourth steps are substantially the same.

2. An in-mold coating method in which a resin molded product is molded and coated in a mold cavity formed between female and male molds, the method comprising:
   a first step of injecting molten resin into a mold cavity with an injection machine;
   a second step of molding a resin molded product after injecting of the molten resin into the mold cavity by reducing a volume of the mold cavity in accordance with a thermal contraction of the molten resin to shape the molten resin; and
   a third step of injecting a coating material between a resin molded product and a surface of the mold cavity when the resin molded product solidifies to an extent to which the product can withstand the injecting pressure and flowing pressure of the coating material,
   wherein mold-clamping forces in the second and third steps are controlled so that the deformation of the mold by clamping is substantially the same in the second and third steps, and
   wherein mold-clamping forces used in the second and third steps are substantially the same.

3. The in-mold coating method according to claim 1, wherein the pressure of the mold-clamping force in the fourth step on the coating material per unit area ranges from 1 to 20 MPa.

4. The in-mold coating method according to claim 1, wherein the pressure of the mold-clamping force in the fourth step on the coating material per unit area ranges from 1 to 10 MPa.

5. The in-mold coating method according to claim 1, wherein the mold-clamping forces used in the second and fourth steps are such that the difference between the mold-clamping forces in terms of in-mold pressures obtained by dividing the forces by the projected area of the mold cavity is 5 MPa or less.

6. The in-mold coating method according to claim 1, wherein the mold-clamping forces used in the second and fourth steps are such that the difference between the mold-clamping forces in terms of in-mold pressures obtained by dividing the forces by the projected area of the mold cavity is 3 MPa or less.

7. The in-mold coating method according to claim 1, wherein the mold-clamping forces used in the second and fourth steps are such that the difference between the mold-clamping forces in terms of in-mold pressures obtained by dividing the forces by the projected area of the mold cavity is 1 MPa or less.

8. The in-mold coating method according to claim 2, wherein the pressure of the mold-clamping force in the third step on the coating material per unit area ranges from 1 to 20 MPa.

9. The in-mold coating method according to claim 2, wherein the pressure of the mold-clamping force in the third step on the coating material per unit area ranges from 1 to 10 MPa.

10. The in-mold coating method according to claim 2, wherein the mold-clamping forces used in the second and third steps are such that the difference in mold-clamping force in terms of in-mold pressure obtained by dividing mold-clamping force by the projected area of a mold cavity is 5 MPa or less.

* * * * *